(12) United States Patent
Hayashi

(10) Patent No.: US 6,791,917 B2
(45) Date of Patent: Sep. 14, 2004

(54) OPTICAL RECORDING MEDIUM AND APPARATUS FOR OPTICALLY REPRODUCING RECORDED INFORMATION

(75) Inventor: Hideki Hayashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 331 days.

(21) Appl. No.: 09/940,676

(22) Filed: Aug. 29, 2001

(65) Prior Publication Data

US 2002/0034136 A1 Mar. 21, 2002

(30) Foreign Application Priority Data

Sep. 4, 2000 (JP) ........................ 2000-267151

(51) Int. Cl.$^7$ ............................................. G11B 7/00
(52) U.S. Cl. ............................. 369/44.34; 369/44.26; 369/275.4
(58) Field of Search ...................... 369/44.26, 44.34, 369/275.1, 275.3, 275.4

(56) References Cited

U.S. PATENT DOCUMENTS

| | | |
|---|---|---|
| 5,523,992 A | 6/1996 | Nomoto ...................... 369/109 |
| 5,777,981 A | 7/1998 | Sugaya et al. ........... 369/275.4 |
| 5,914,920 A | 6/1999 | Yokogawa ................ 369/44.26 |
| 5,982,738 A * | 11/1999 | Miyamoto et al. ........ 369/275.3 |
| 6,014,363 A * | 1/2000 | Nakamura et al. ........ 369/275.1 |
| 6,118,752 A * | 9/2000 | Miyagawa et al. ....... 369/275.3 |
| 6,128,272 A * | 10/2000 | Horimai et al. ........... 369/44.26 |
| 6,233,214 B1 | 5/2001 | Hayashi ................... 369/59.23 |
| 6,266,318 B1 | 7/2001 | Honda et al. ............ 369/275.3 |

FOREIGN PATENT DOCUMENTS

| | | |
|---|---|---|
| EP | 1 158 498 A2 | 11/2001 |
| JP | 06325368 A * | 11/1994 |

* cited by examiner

Primary Examiner—Thang V. Tran
(74) Attorney, Agent, or Firm—Morgan, Lewis & Bockius LLP

(57) ABSTRACT

An optical recording medium that permits high density recording and only needs a recording machine of simple structure, and a machine for reproducing recorded information from such optical recording medium. A track pitch of recording tracks is smaller than a diameter of a beam spot of a scanning laser beam, and tracking pits for tracking control are formed on the respective recording tracks. A certain number of neighboring recording tracks define a group, and in each group the tracking pits are spaced from each other in a recording track direction by a predetermined interval which is smaller than the diameter of the beam spot.

3 Claims, 8 Drawing Sheets

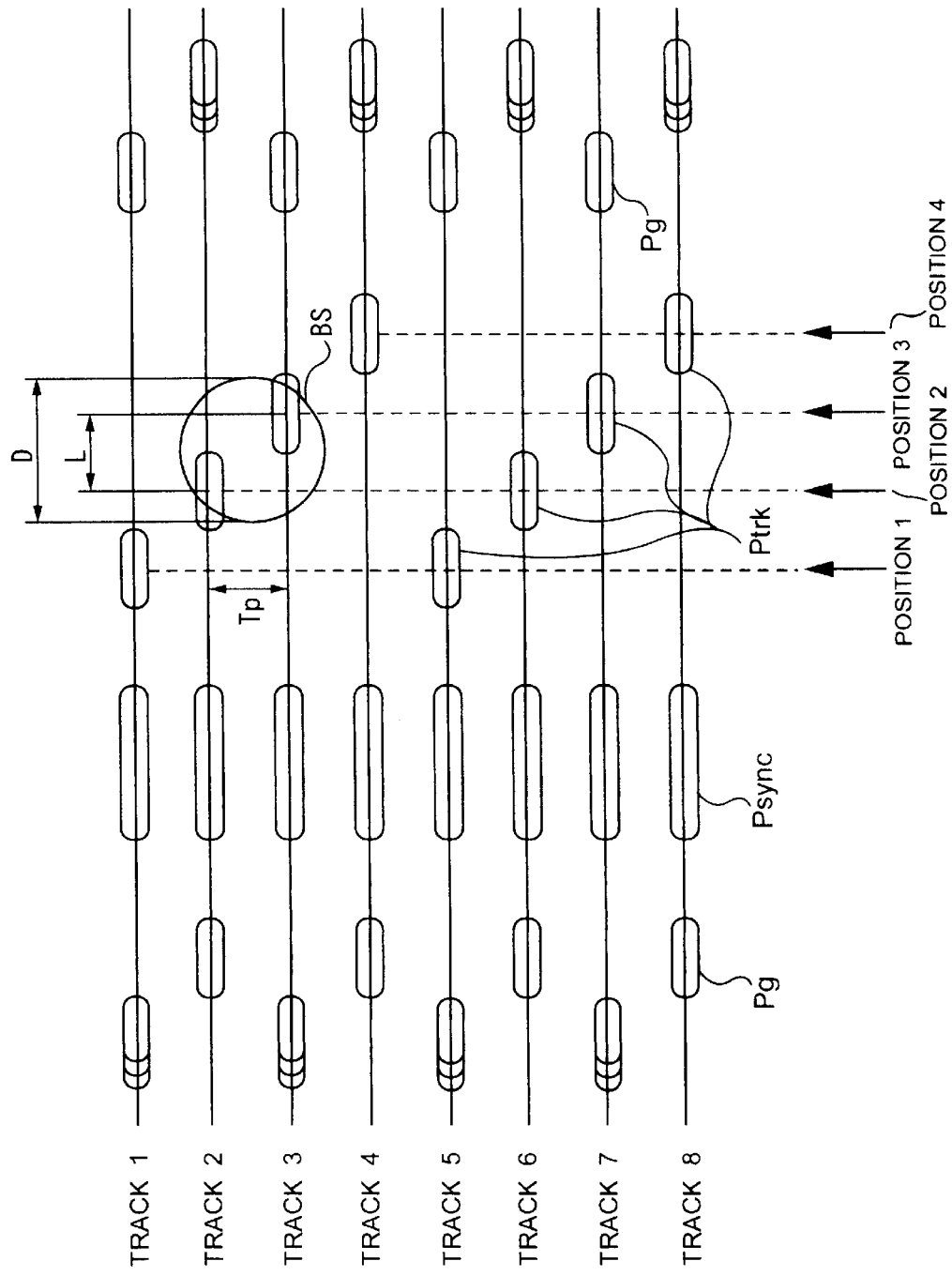

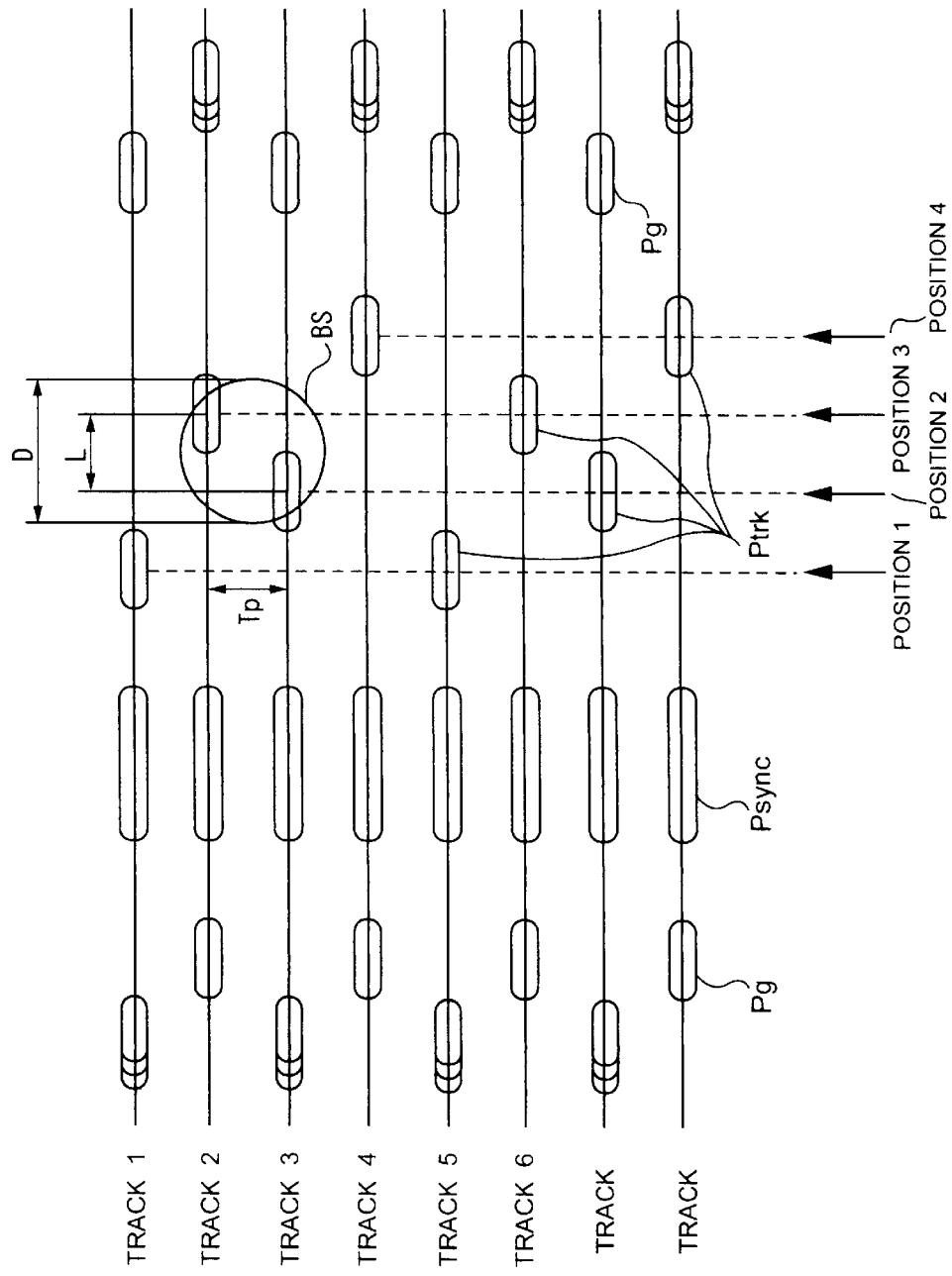

OPTICAL RECORDING MEDIUM AND APPARATUS FOR OPTICALLY REPRODUCING RECORDED INFORMATION

BACKGROUND OF THE INVENTION

1. Field of the Invention

The present invention relates to an optical recording medium and an apparatus for optically reproducing (retrieving, playing back) information recorded on the optical recording medium.

2. Description of Related Art

FIG. 1 of the accompanying drawings illustrates a configuration of a recording surface of an optical disc, which is a conventional optical recording medium reproduced with sampled servo control.

As illustrated in FIG. 1, servo regions for recording various kinds of pits as servo references for a reproduction apparatus and data regions for recording digital data are alternately provided on respective recording tracks of the optical disc. The servo and data regions are aligned in a radial direction of the disc.

Referring to FIG. 2, illustrated is a detailed arrangement of the pits in the servo region.

As depicted in this drawing, the recording tracks are spaced from each other by a track pitch Tp. Two wobble pits Pwbl are formed in each of the servo regions along each of the recording tracks, and serve as references for the reproduction apparatus when the reproduction apparatus performs the tracking servo. One of the wobble pits in each pair is located above the associated recording track at a predetermined distance, and the other wobble pit is located below the recording track at the same distance. A clock pit Pclk is formed in each servo region on each recording track and serves as a reference for the reproduction apparatus when performing clock retrieval. A mirror portion between the wobble pits Pwbl and clock pit Pclk is used as a synchronization reference for the reproduction apparatus.

When the recorded information should be read out from the optical disc having the above described structure, a pickup installed in the reproduction apparatus radiates a scanning (reading) laser beam onto the recording surface of the optical disc to create a beam spot BS on the recording surface as shown in FIG. 2. As the optical disc rotates, the beam spot BS traces the recording track indicated by the solid line in FIG. 2 from the left to the right. The pickup receives reflected light of the beam spot BS from the recording surface and obtains a scanned (read) signal in accordance to an amount of the reflected light. During this operation, the tracking servo is conducted in order for the beam spot BS to accurately trace the recording track. To this end, the beam spot BS is required to trace the recording track that extends on the center line of the two wobble pits Pwbl. The tracking servo is therefore performed in such a way that scan signals resulting from the two wobble pits Pwbl have the same level.

The diameter D of the beam spot BS is proportional to a wavelength λ of a scanning laser beam and inversely proportional to the numerical aperture NA of an objective lens. In other words, the following equation is established:

$D = k \cdot \lambda / NA$ ($k$ is a proportion constant)

In general, the diameter D of the beam spot BS is defined by a circle diameter at which the light intensity becomes $1/e^2$ of the light intensity at the beam spot center. k=0.82 is under this condition so that the above equation becomes as follows:

$D = 0.82 \cdot \lambda / NA$

The optical disc of the conventional sampled servo scheme and the apparatus for reproducing the recorded information from such optical disc have the following values:

λ=780 [nm]

NA=0.5

D=1279 [nm]

Tp=1600 [nm]

Accordingly, the track pitch Tp shown in FIG. 2 is greater than the diameter D of the beam spot BS. In addition, although the interval (distance) L between a pair of wobble pits Pwbl in the information scanning direction varies with the disc radius as understood from FIG. 2, the wobble pit interval L is 2030 [nm] when measured at the disc radius of 30 [nm]. Thus, the wobble pit interval L is greater than the diameter D of the beam spot BS.

The above described conventional optical disc has the track pitch Tp greater than the beam spot diameter D so that recording density is low in the disc radius direction, and has the wobble pit interval L greater than the beam spot diameter D so that recording density is low in the recording track direction. Consequently, the recording density of the conventional optical disc is low on the recording surface.

Furthermore, the conventional optical disc needs to record the wobble pits at positions spaced from the recording track in the disc radius direction in order for the reproduction apparatus to conduct the tracking servo.

Therefore, a recording apparatus requires a deflection device to deflect a recording laser beam in the disc radius direction when the recording apparatus records the wobble pits. As a result, the recording apparatus has a complicated structure.

OBJECTS AND SUMMARY OF THE INVENTION

The present invention was developed to overcome the above described problems, and its primary object is to provide an optical recording (storage) medium that permits high density recording and allows use of a recording apparatus having a simpler structure, and to provide an apparatus for optically reproducing recorded information from such optical recording medium.

According to one aspect of the present invention, there is provided an optical recording medium comprising recording tracks formed on a recording surface of the optical recording medium, and tracking pits for tracking servo control formed on the recording surface of the optical recording medium, wherein a track pitch of the recording tracks is smaller than a diameter of a beam spot of a scanning laser beam radiated onto the recording medium, the tracking pits are formed on the recording tracks, a plurality of neighboring recording tracks define a group, and the tracking pits in each group are spaced from each other in a recording track direction by a predetermined distance which is smaller than the diameter of the beam spot.

According to another aspect of the present invention, there is provided an apparatus for optically reproducing recorded information from an optical recording medium, the optical recording medium having tracking pits for tracking servo control formed on recording tracks, comprising a pickup for radiating a scanning laser beam onto the optical recording medium to obtain read signals in accordance with a reflected light of the scanning laser beam, an A/D converter for sampling the read signals to convert them into a series of sampled values, and tracking error detecting part for extracting two sampled values corresponding to tracking pits formed on two adjacent recording tracks from the series of sampled values to take a level difference between the extracted sampled values as. a tracking error.

BRIEF DESCRIPTION OF THE DRAWINGS

FIG. 6 illustrates a structure of a servo region on an optical disc according to another embodiment of the present invention;

FIG. 8 illustrates a construction of a servo region on an optical disc according to still another embodiment of the present invention.

DETAILED DESCRIPTION OF THE INVENTION

Embodiments of the present invention will now be described in reference to the accompanying drawings.

Figure 1:
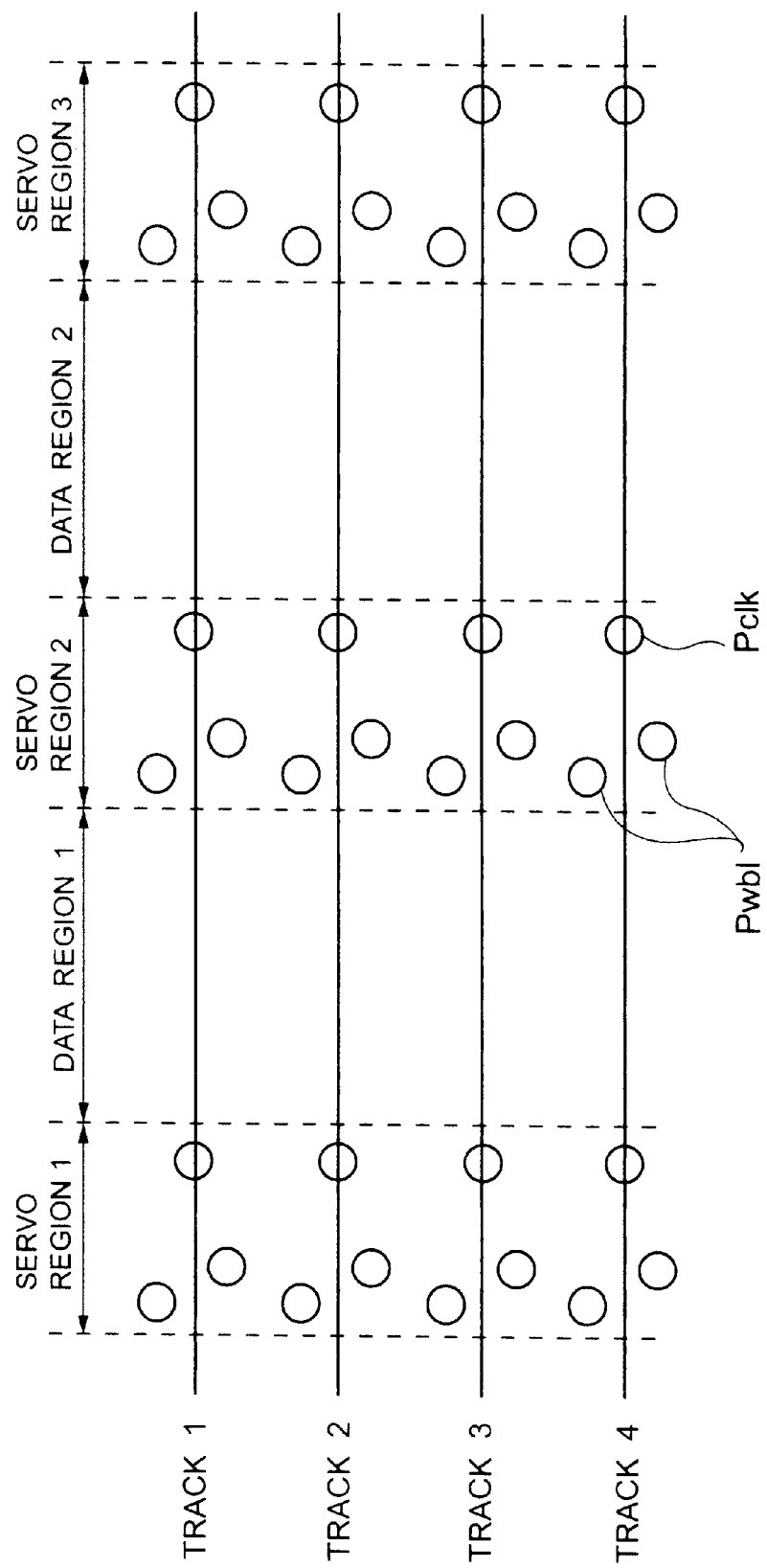
FIG. 1 illustrates a configuration of the recording surface of the conventional optical disc that operates under the sampled servo scheme.
Figure 2:
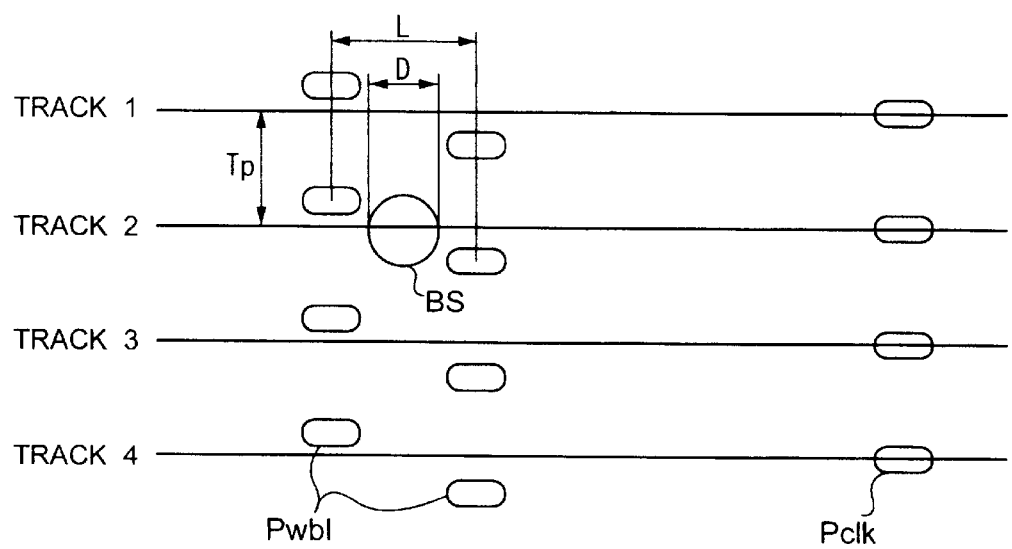
FIG. 2 illustrates the structure of a servo region on the optical disc shown in FIG. 1.
Figure 3:
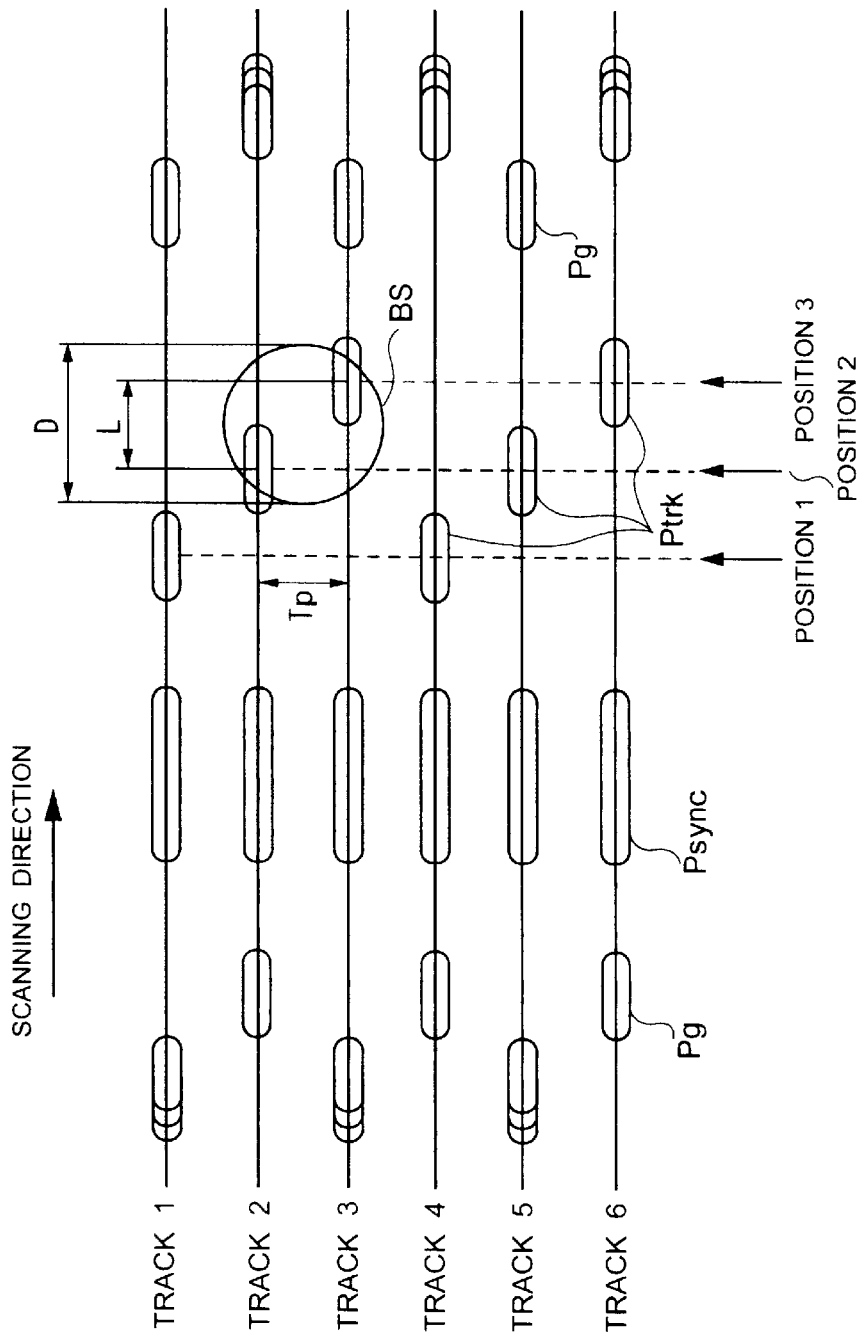
FIG. 3 illustrates a structure of a servo region on an optical disc according to the present invention.

Referring to FIG. 3, illustrated is a structure in a servo region on an optical disc, which is an example of the optical recording medium of the present invention.

As shown in this drawing, a guard pit Pg, a synchronization pit Psync and a tracking pit Ptrk are formed on each of a plurality of recording tracks in the servo region. It should be noted that although a plurality of tracks (Tracks 1 to 6) are shown in FIG. 3, these tracks define in fact a single continuous recording track in the case of an optical disc having a spiral track structure.

The guard pits Pg are formed in the servo region in the vicinity of borders of the servo region and data region to prevent interference between the servo and data regions. The synchronization pits Psync are aligned in the radius direction of the disc, elongated more than other pits, and serve as synchronization references for a recorded information reproduction apparatus.

The tracking pits Ptrk are located at three different positions in the information scanning direction and serve as tracking servo references for the reproduction apparatus.

For the sake of easier description, the positions of the tracking pits Ptrk are referred to as Position 1, Position 2 and Position 3 from the left in FIG. 3. Thus, the tracking pits Ptrk are formed at Position 1 on the recording track 1, at Position 2 on the recording track 2 and at Position 3 on the recording track 3. Positions 1 to 3 are spaced from each other by the same interval (distance) L in the information scanning direction. As seen in the drawing, the arrangement of the tracking pits Ptrk at Positions 1 to 3 is repeated for the next three tracks.

A pickup installed in the reproduction apparatus radiates a scanning laser beam and creates a beam spot BS on a recording surface as shown in FIG. 3. The beam spot BS traces the center line between adjacent recording tracks from the left to the right as shown in FIG. 3 upon rotation of the disc. The pickup receives a reflected light of the beam spot BS from the recording surface and obtains scanned signals (read signals) that correspond to an amount of the reflected light. During this operation, the tracking servo control is carried out such that the beam spot BS accurately traces the center line between adjacent recording tracks.

In the case of the optical disc shown in FIG. 3, the beam spot BS is required to trace the center of the two tracking pits Ptrk formed on the adjacent recording tracks.

For this reason, the tracking servo control is performed such that a scanned signal level obtained upon tracing one tracking pit Ptrk formed on one recording track becomes equal to that obtained upon tracking the other tracking pit Ptrk formed on the adjacent recording track.

Specifications of the optical disc shown in FIG. 3 and the apparatus for reproducing recorded information from this optical disc are given below.

Scanning Laser Beam Wavelength $\lambda$=405 [nm]
Numerical Aperture of Objective Lens radiating Scanning Laser Beam NA=0.65
Beam Spot Diameter D=511 [nm]
Track Pitch Tp=283 [nm]
Tracking Pit Interval in Information Scanning Direction L=273 [nm]

As understood from the above, the track pitch on the optical disc is smaller than the beam spot diameter of the scanning laser beam. Further, the interval between the tracking pits formed on the adjacent recording tracks in the information scanning direction is smaller than the beam spot diameter.

In this manner, the optical disc of FIG. 3 has the track pitch smaller than the spot diameter of the scanning laser beam, and the tracking pits on the respective recording tracks for the tracking control. In addition, the three adjacent recording tracks define a group, and in each group the positions of the three tracking pits Ptrk are shifted sequentially in the recording track direction by a predetermined interval L, which is smaller than the beam spot diameter D.

Consequently, the optical disc shown in FIG. 3 has a narrower track pitch so that it possesses a higher track density, and has a shorter pit interval so that it possesses a higher linear recording density. Thus, this optical disc can record information at high density.

Figure 4:
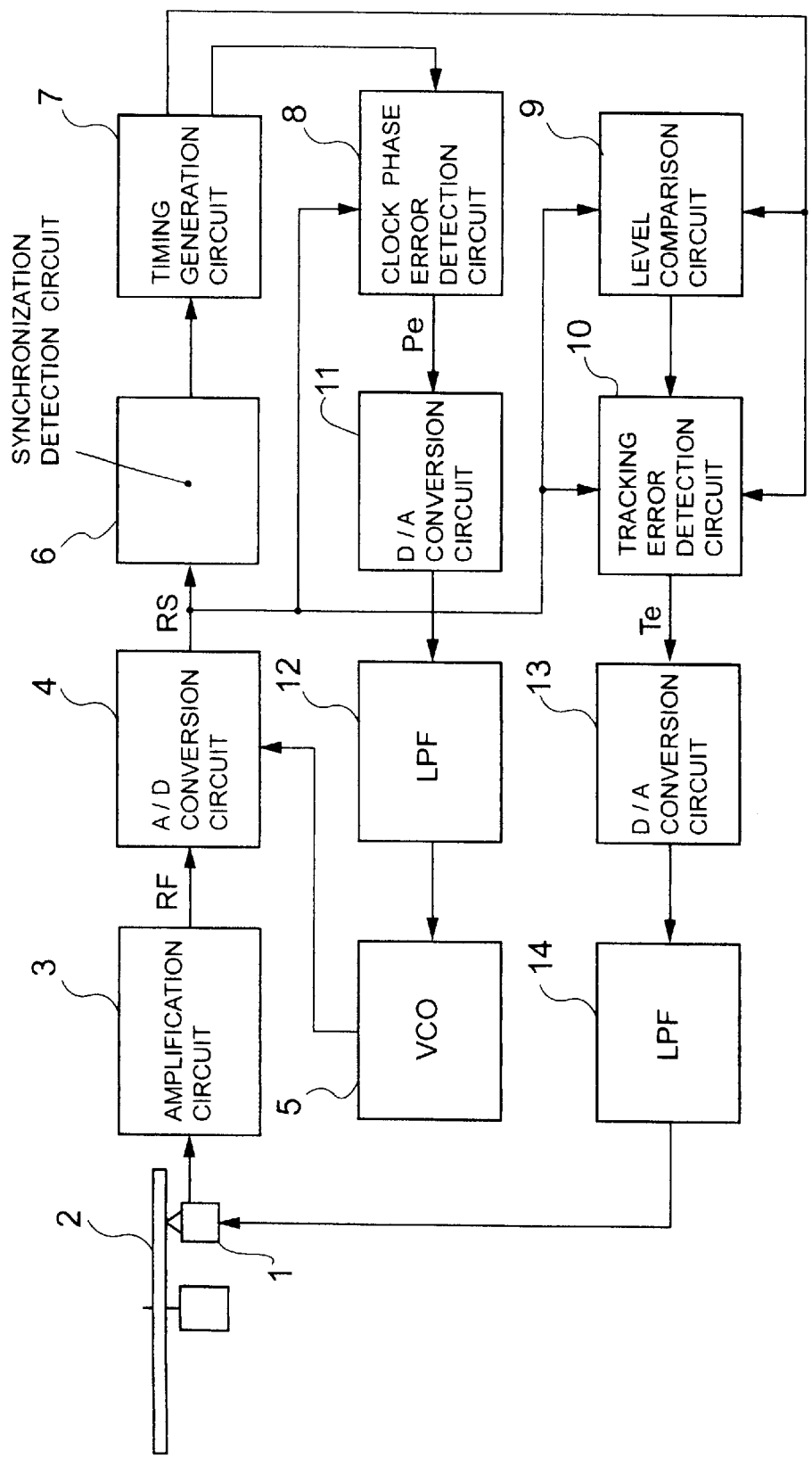
FIG. 4 illustrates a construction of an apparatus for optically reproducing recorded information according to the present invention.

FIG. 4 illustrates a construction of the apparatus for optically reproducing recorded information from the optical disc.

The pickup 1 radiates a scanning laser beam onto the recording surface of the optical disc 2 as described above, obtains an analog read signal resulting from photoelectric conversion of the reflected light, and supplies it to an amplification circuit 3. The amplification circuit 3 amplifies this analog signal and supplies the resulting signal RF to an A/D conversion circuit 4. The A/D conversion circuit 4 samples the analog signal RF in synchronization with a reproduction clock fed from VCO (Voltage Controlled Oscillator) 5 to obtain a series of sampled values RS. A synchronization detection circuit 6 detects a segment that corresponds to the synchronization pit Psync from the series of sampled values RS, and supplies an obtained synchronization detection signal to a timing generation circuit 7. The timing detection circuit 7 generates various timing signals on the basis of the synchronization detection signal as a time reference, and supplies them to a clock phase error detection circuit 8, a level comparison circuit 9 and a tracking error detection circuit 10. The clock phase error detection circuit 8 first extracts two sampled values that correspond to edges of the synchronization pit Psync from the series of sampled values RS in response to the timing signal. It then calculates a. level difference between these sampled values, and supplies the resultant as a phase error data Pe to the D/A conversion circuit 11. The D/A conversion circuit 11 converts the phase error data Pe to an analog phase error signal and feeds it to LPF (Low Pass Filter) 12. LPF 12 smoothes the waveform of the phase error signal and feeds the resulting signal to VCO 5. VCO 5 changes an oscillation frequency in response to the level of the smoothed phase error signal so as to generate a reproduction clock in phase synchronization with the signal RF, and supplies it to the A/D conversion circuit 4.

The A/D conversion circuit 4, clock phase error detection circuit 8, D/A conversion circuit 11, LPF 12 and VCO 5 constitute in combination a PLL (Phase Locked Loop) circuit. The PLL circuit is a servo loop that causes the reproduction clock to be phase synchronized with the analog signal RF.

The level comparison circuit 9 extracts three sampled values that correspond to the tracking pits Ptrk from the series of sampled values RS in response to the timing signal, and compares the levels of these sampled values with each other to determine a pattern of the tracking pits Ptrk. The level comparison circuit 9 then supplies a pattern determination signal, which represents a result of the determination, to the tracking error detection circuit 10. The tracking error detection circuit 10 extracts two sampled values, which correspond to the tracking pits Ptrk, from the series of sampled values RS in response to the pattern determination signal and timing signal, and calculates and supplies a difference between the levels of these two sampled values as a tracking error data Te to the D/A conversion circuit 13. The D/A conversion circuit 13 converts the tracking error data Te into an analog tracking error signal and supplies it to LPF (Low Pass Filter) 14. LPF 14 smoothes the waveform of the tracking error signal and supplies it to the pickup 1. The pickup 1 controls the radiation position of the beam spot BS in the disc radius direction in response to the smoothed tracking error signal.

The amplification circuit 3, A/D conversion circuit 4, tracking error detection circuit 10, D/A conversion circuit 13, LPF 14 and pickup 1 constitute in combination a tracking servo loop. The tracking servo loop is a servo loop that causes the beam spot BS to trace the center line between adjacent recording tracks.

Figure 5A:
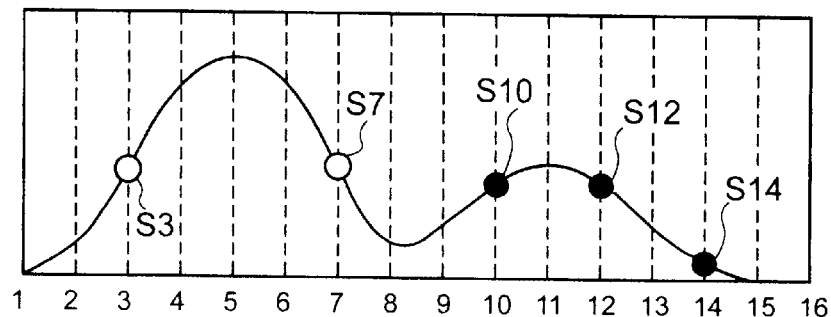
FIGS. 5A to 5C are diagrams illustrating waveforms of scanned signals obtained from the servo region shown in FIG. 3 by the optical reproduction apparatus shown in FIG. 4 respectively.
Figure 5B:
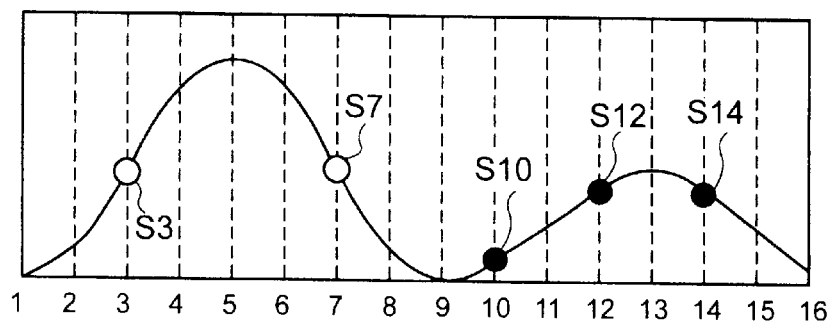
Figure 5C:
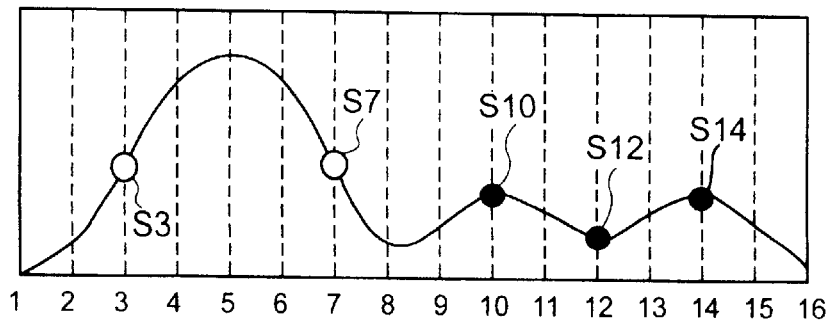

Referring to FIGS. 5A to 5C, illustrated are waveforms of read signals obtained when the optical reproduction apparatus scans the recorded information from the servo regions (FIG. 3) formed on the optical disc 2. Specifically, FIG. 5A illustrates the waveform of the read signal acquired when the beam spot BS traces the center between Recording Tracks 1 and 2 in FIG. 3. FIG. 5B depicts the waveform of the read signal obtained when the beam spot BS traces the center between Recording Tracks 2 and 3 in FIG. 3. FIG. 5C depicts the waveform of the read signal obtained when the beam spot BS traces the center between Recording Tracks 3 and 4 in FIG. 3. In FIGS. 5A to 5C, the broken lines indicate the sampling timing of the A/D conversion circuit 4 in response to the reproduction clock. Sixteen sampled values S1 to S16 are acquired at the time t1 to t16 respectively.

In FIGS. 5A to 5C, the sampled values S3 and S7 indicated by the unshaded circles are sampled values that correspond to the edges of the synchronization pit Psync. The level difference between these two sampled values S3 and S7 represents the phase error of the reproduction clock. In other words, the clock phase error detection circuit 8 obtains the phase error data Pe from the following calculation using the sampled values S3 and S7.

$$Pe = S3 - S7$$

On the other hand, the level comparison circuit 9 compares the levels of three sampled values S10, S12 and S14 indicated by the shaded circles in FIGS. 5A to 5C with each other to determine the arrangement pattern of the tracking pits Ptrk.

In the case of FIG. 5A;

S14<S10 and

S14<S12, so that the tracking pits Ptrk on the recording tracks on both sides of the beam spot BS are situated at Positions 1 and 2. Thus, it is considered that the beam spot BS is now tracing between Recording Tracks 1 and 2. The level difference between the sampled values S10 and S12 that correspond to the two tracking pits Ptrk represents the tracking error of the beam spot BS. The tracking error detection circuit 10 therefore obtains the tracking error data Te from the following calculation using the sampled values S10 and S12:

$$Te = S10 - S12$$

Likewise, in the case of FIG. 5B the level comparison circuit 9 determines that S10<S12 and

S10<S14, so that the tracking error detection circuit 10 obtains a tracking error data Te which is given by the following equation:

$$Te = S12 - S14.$$

Similarly, in the case of FIG. 5C the level comparison circuit 9 determines that S12<S10 and

S12<S14, so that the tracking error detection circuit 10 obtains a tracking error data Te which is given by the following equation:

$$Te = S14 - S10.$$

It should be noted that the level comparison circuit 9 may extract the two highest ones among the three sampled values S10, S12 and S14 and the tracking error detection circuit 10 may calculate the level difference of these two extracted sampled values and take it as the tracking error data Te.

As described above, the reproduction apparatus for optically reproducing the recorded information performs the level comparison of the sampled values in the level comparison circuit 9 to determine the pattern of the tracking pits Ptrk. The apparatus then obtains the level difference of the sampled values derived from the tracking pits Ptrk, in the tracking error detection circuit 10 to detect the tracking error. As a result, it is possible to accurately detect the tracking error and correctly perform the tracking servo even if the track pitch is narrow and the tracking pit interval is short.

It should be noted that the servo regions of the optical disc 2 shown in FIG. 3 may be replaced with those shown in FIG. 6.

Referring to FIG. 6, a guard pit Pg, a synchronization pit Psync and a tracking pit Ptrk are formed on each of a plurality of recording tracks in the servo region. It should be noted that a plurality of recording tracks (Tracks 1 to 8) are shown in FIG. 6, but these recording tracks define in fact a single continuous recording track when the optical disc has a spiral track configuration.

In the drawing, the guard pits Pg are located in the servo region near the borders of the servo and data regions to prevent interference between the servo and data regions. The synchronization pits Psync are aligned in the radius direction of the disc, elongated more than other pits, and serve as synchronization references for the reproduction apparatus.

The tracking pits Ptrk are located at four different positions in the information scanning direction and serve as tracking servo references for the reproduction apparatus. For description purpose, the positions of the tracking pits Ptrk are referred to as Position 1, Position 2, Position 3 and Position 4 from the left in FIG. 6. Thus, the tracking pits Ptrk are formed at Position 1 on Recording Track 1, at Position 2 on the Recording Track 2, at Position 3 on Recording Track 3 and at Position 4 on Recording Track 4 respectively. Positions 1 to 4 are spaced from each other by the same interval L in the information scanning direction.

As shown in the drawing, this arrangement of the tracking pits Ptrk is repeated for the next four tracks. Accordingly, the optical disc shown in FIG. 6 is the same as that shown in FIG. 3 in that the recording track pitch is smaller than the beam spot diameter of the scanning laser beam and the tracking pits are formed on the respective recording tracks for the tracking control. In the optical disc of FIG. 6, however, four adjacent recording tracks define a group, and in each group the positions of the four tracking pits Ptrk are shifted sequentially in the recording track direction by a predetermined distance L, which is smaller than the beam spot diameter D.

Figure 7A:
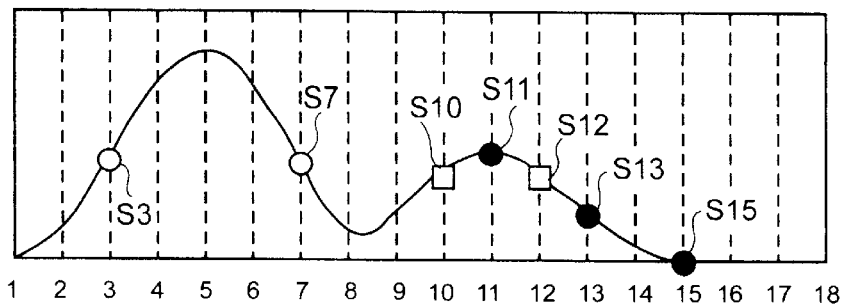
FIGS. 7A to 7D are diagrams illustrating waveforms of signals scanned from the servo region shown in FIG. 6 by the optical reproduction apparatus shown in FIG. 4 respectively.
Figure 7B:
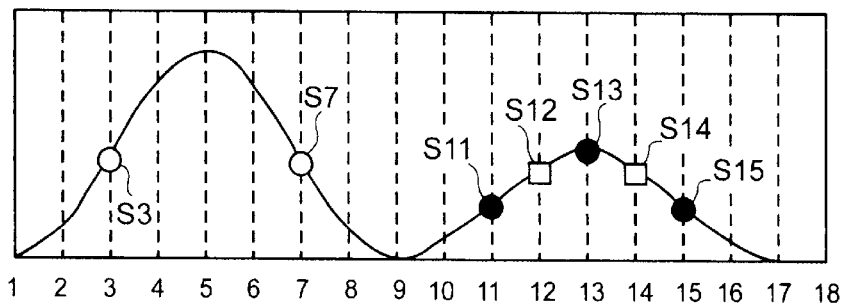

Referring to FIGS. 7A to 7D, illustrated are waveforms of scanned signals obtained when the optical reproduction apparatus reads the recorded information from the servo regions (FIG. 6) formed on the optical disc 2. Specifically, FIG. 7A illustrates the waveform of the scanned signal acquired when the beam spot BS traces between Recording Tracks 1 and 2 in FIG. 6. FIG. 7B depicts the waveform of the scanned signal obtained when the beam spot BS traces between Recording Tracks 2 and 3 in FIG. 6.

Figure 7C:
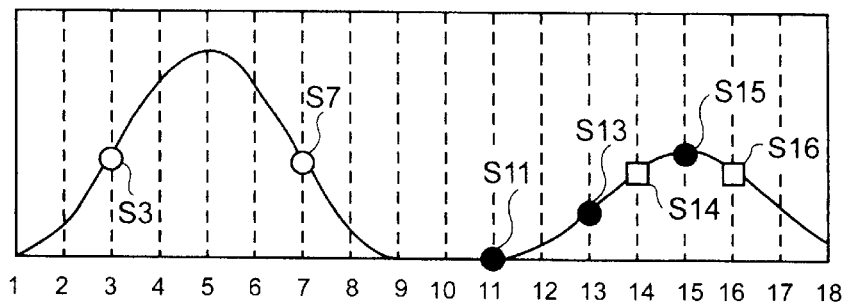
Figure 7D:
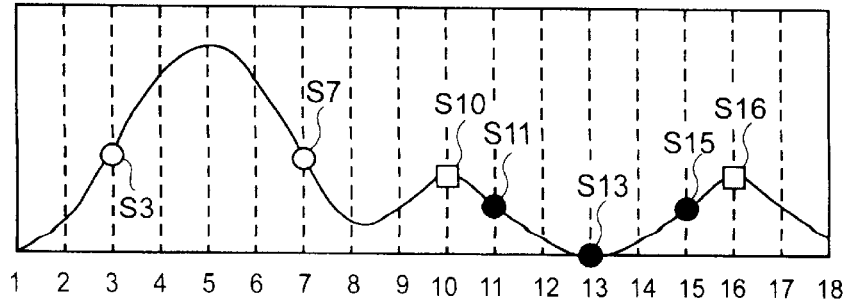

FIG. 7C depicts the waveform of the scanned signal obtained when the beam spot BS traces between Recording Tracks 3 and 4 in FIG. 6. FIG. 7D depicts the waveform of the scanned signal obtained when the beam spot BS traces between Recording Tracks 4 and 5 in FIG. 6. In FIGS. 7A to 7D, the broken lines indicate the sampling timing of the A/D conversion circuit 4 in response to the reproduction clock. Eighteen sampled values S1 to S18 are acquired at the time t1 to t18 respectively.

In the case of FIGS. 7A to 7D, like the case where the recorded information is reproduced from the servo regions shown in FIG. 3, the clock phase error detection circuit 8 obtains the phase error data Pe from the following equation:

$$Pe = S3 - S7$$

On the other hand, the level comparison circuit 9 compares the levels of three sampled values S11, S13 and S15 indicated by the shaded circles in FIGS. 7A to 7D with each other to determine the arrangement pattern of the tracking pits Ptrk.

In the case of FIG. 7A;

$$S11 > S13 > S15$$

so that the tracking pits Ptrk located on the recording tracks at both ends of the beam spot BS are situated at Positions 1 and 2. Thus, it is considered that the beam spot BS is now tracing between Recording Tracks 1 and 2. The level difference between the sampled values S10 and S12 that are derived from the two tracking pits Ptrk and indicated by the squares in FIGS. 7A to 7D represents the tracking error of the beam spot BS.

The tracking error detection circuit 10 therefore obtains the tracking error data Te from the following equation using the sampled values S10 and S12:

$$Te = S10 - S12$$

Likewise, in the case of FIG. 7B the level comparison circuit 9 determines that $$S13 > S11 \text{ and}$$

$$S13 > S15,$$

so that the tracking error detection circuit 10 obtains a tracking error data Te from the following equation:

$$Te = S12 - S14.$$

Similarly, in the case of FIG. 7C the level comparison circuit 9 determines that $$S11 < S13 < S15,$$

so that the tracking error detection circuit 10 obtains a tracking error data Te from the following equation:

$$Te = S14 - S16.$$

In the case of FIG. 7D, the level comparison circuit 9 determines that $$S13 < S11 \text{ and}$$

$$S13 < S15,$$

so that the tracking error detection circuit 10 obtains a tracking error data Te from the following equation:

$$Te = S16 - S10.$$

It should be noted that the level comparison circuit 9 may extract the two highest ones among the four sampled values S10, S12, S14 and S16 and the tracking error detection circuit 10 may obtain the level difference of these two extracted sampled values and take it as the tracking error data Te.

It should also be noted that the servo regions of the optical disc 2 shown in FIG. 3 or 6 may be replaced with those shown in FIG. 8.

The servo region shown in FIG. 8 is similar to that shown in FIG. 6 in that the tracking pits Ptrk have four different positions in the information scanning direction. In the servo region shown in FIG. 8, however, the tracking. pits Ptrk are positioned at Position 1 on Recording Track 1, at Position 3 on Recording Track 2, at Position 2 on Recording Track 3, and at Position 4 on Recording Track 4. This pattern of arrangement is repeated for the next four tracks, as in the case of FIG. 6.

The optical disc of the present invention is applicable to various kinds of optical disc medium.

For example, the present invention can be applied to an optical disc of read-only-type that has recorded concavo-convex pits in the data regions, an optical disc of write-once-type that allows digital data to be written in the data regions only once, and an optical disc of rewritable-type that allows digital data to be rewritten in the data regions by means of phase change recording or magneto-optical recording. In all of these cases, the tracking pits Ptrk are recorded in the form of concavo-convex pits in the servo regions.

As understood from the foregoing, the optical recording medium of the present invention has the recording tracks of which track pitch is smaller than the diameter of the beam spot of the scanning laser beam, and has the tracking pits on the respective recording tracks for the tracking servo control. Further, the positions of the tracking pits in each group of neighboring tracking pits are shifted from each other in the recording track direction by the predetermined interval which is smaller than the beam spot diameter.

The optical recording medium of the present invention therefore has the track pitch smaller than the beam spot diameter of the scanning laser beam so that the recording density is raised in the disc radius direction, and has the tracking pit interval smaller than the beam spot diameter so that the recording density is raised in the recording track direction.

In addition, since the pits for the tracking servo control are formed on the recording tracks, a recording apparatus does not need a deflector to record wobble pits. This simplifies the structure of the recording apparatus. Moreover, the optical apparatus for reproducing the recorded information according to the present invention can determine between which two tracks the beam spot is tracing by comparing the levels of the sampled values scanned from the above described optical recording medium.

It is consequently possible to accurately detect the tracking error even if the track pitch is narrow and the tracking pit interval is short. Thus, it is feasible to reproduce (retrieve, play back) the recorded information at high precision, even from the optical recording medium having a high recording density.

This application is based on Japanese Patent Application No. 2000-267151 which is herein incorporated by reference.

What is claimed is:

1. An optical recording medium comprising:

recording tracks formed on a recording surface of the optical recording medium such that a track pitch of the recording tracks is smaller than a diameter of a beam spot of a scanning laser beam radiated onto the recording medium, a plurality of neighboring recording tracks defining a group; and tracking pits for tracking servo control formed on the recording tracks of the optical recording medium, such that the tracking pits in each group of recording tracks are spaced from each other in a recording track direction by a predetermined distance which is smaller than the diameter of the beam spot.

2. The optical recording medium according to claim 1, wherein the track pitch satisfies the following condition:

$$Tp < 0.82\lambda/NA$$

where Tp represents the track pitch; $\lambda$ represents a wavelength of the scanning laser beam; and NA represents the numerical aperture of an objective lens used to radiate the scanning laser beam, and the predetermined distance satisfies the following equation:

$$L < 0.82\lambda/NA$$

where L represents the predetermined distance.

3. An apparatus for reproducing recorded information from an optical recording medium, the optical recording medium having tracking pits for tracking servo control formed on recording tracks, the apparatus comprising:

a pickup for radiating a scanning laser beam onto an optical recording medium to obtain read signals in response to a reflected light of the scanning laser beam;

an A/D converter for sampling the read signals to convert them into a series of sampled values; and a tracking error detecting part for extracting sampled values deriving from tracking pits formed on two adjacent recording tracks from the series of sampled values to take a level difference between the extracted sampled values as a tracking error.

* * * * *